I. SCHNEER.
SHIRT.
No. 10,096. Reissued Apr. 25, 1882.
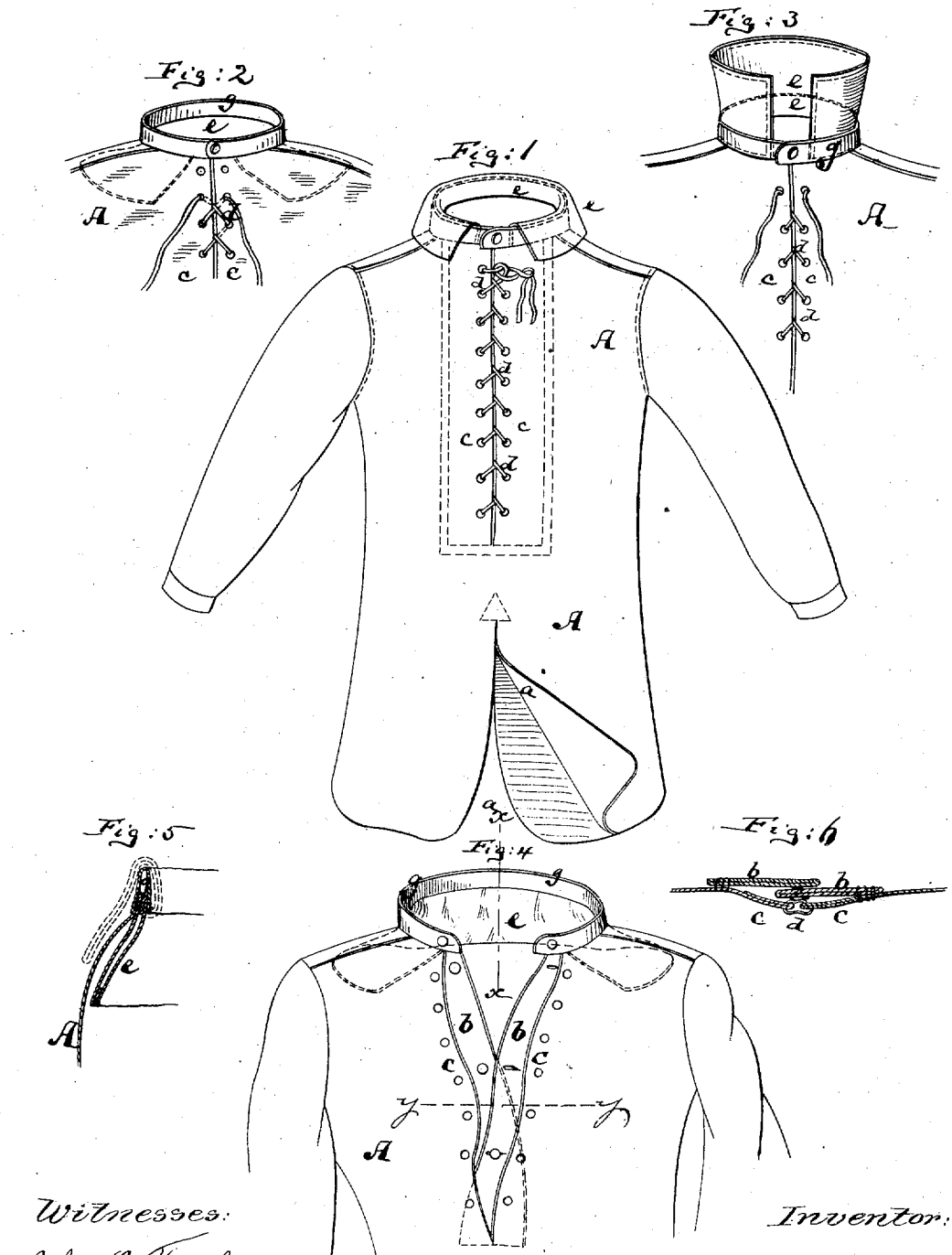
Witnesses:
John C. Dunbridge.
Henry T. Parker
Inventor:
Isaac Schneer
by his attorneys
Briesen & Betts
N. PETERS, Photo-Lithographer, Washington, D. C.

UNITED STATES PATENT OFFICE.

ISAAC SCHNEER, OF NEW YORK, N. Y.

SHIRT.

SPECIFICATION forming part of Reissued Letters Patent No. 10,096, dated April 25, 1882.

Original No. 254,387, dated February 28, 1882. Application for reissue filed March 21, 1882.

*To all whom it may concern:*

Be it known that I, ISAAC SCHNEER, of New York, in the county and State of New York, have invented a new and useful Improvement in Shirts, of which the following is a specification.

Figure 1 is a front view of a shirt of the improved construction. Fig. 2 is a front view of the neck portion with the collar turned inward. Fig. 3 is a similar view with the collar turned up. Fig. 4 is a face view with the front unlaced to show the construction. Fig. 5 is a section on line *x x*, Fig. 4; and Fig. 6, a section on line *y y* of Fig. 4.

A is the shirt of usual construction, except as hereinafter specified. The shirt has slits *a* in the lower part, which slits extend from the bottom any desired distance upward, and by their position allow the shirt to open or give way in the direction most natural and convenient.

The shirt is made with an open bosom formed to button by means of inner flaps, *b b*, attached at the inside, as shown in Figs. 4 and 6. The outer flaps, *c*, formed by the main body of the garment, are made with eyelets, through which a lacing-cord, *d*, is strung, so that these outer flaps can be drawn up as closely as desired. This lacing is more reliable and stronger than buttons, and gives an ornamental appearance to the bosom, as is desired, on fancy flannel shirts.

The shirt is provided with a neckband, *g*, of ordinary character, to the lower portion of which neckband—that is to say, below the top edge of the same—is attached, on the inner side thereof, a collar, *e*, so that the collar, when turned inward, hangs entirely below the neckband *g*, and in that case the band may be used with a separate collar, while the collar *e* remains folded inward. The collar *e* may, however, be turned up and then over the neckband, and down on the outer side thereof, as shown in Figs. 1 and 3, for use as a collar. With dress-shirts this reversible collar *e* avoids the necessity of changing the garment when the collar *e* is slightly soiled, because in that case the collar *e* can be turned in and entirely concealed and another put on the neckband *g*.

With flannel shirts it gives the advantage of a collar of the same material, which, with a lawn-tennis shirt, can be worn in the field, and afterward readily replaced by another when the appearance of ordinary dress is desired.

I do not limit myself to the material of the shirt, as that may be varied according to its intended use.

The collar, when to be displayed, is first turned up, as in Fig. 3, and then outward and downward, as in Fig. 1, and does in this position embrace the neckband on the inner side, outer side, and on top.

I do not claim a supplemental collar fastened to a garment inside of an ordinary collar, as shown in Reissued Patent No. 7,759, as in that case the ordinary collar cannot be entirely folded inward.

I claim—

1. In shirts having open bosoms, the combination of inner flaps, *b*, outer flaps, *c*, having eyelets and lacing-cord *d*, substantially as shown and described.

2. In a garment having neckband *g*, the combination thereof with the collar *e*, which is fastened to the inner part of said neckband, below the top edge thereof, and adapted to be entirely concealed when folded inward, and to be folded upward, outward, and downward around the neckband *g*, substantially as herein shown and described.

This specification of my invention signed by me this 17th day of March, 1882.

ISAAC SCHNEER.

Witnesses:
JAMES TURK,
WILLY G. E. SCHULTZ.